United States Patent [19]

Miltenberger et al.

[11] 4,326,872
[45] Apr. 27, 1982

[54] METHOD FOR MAKING PERFORATIONS OR DEPRESSIONS IN A GLASS WORK PIECE

[75] Inventors: Charles W. Miltenberger, Saugus; Edward J. Lucas, Simi Valley; Ulrich Schreier, San Francisco, all of Calif.

[73] Assignee: Technology Glass Corporation, Sunnyvale, Calif.

[21] Appl. No.: 164,699

[22] Filed: Jun. 30, 1980

[51] Int. Cl.³ .............................................. C03B 23/26
[52] U.S. Cl. ....................................... 65/112; 65/23; 65/56; 65/105
[58] Field of Search ..................... 65/23, 56, 87, 105, 65/112, 22

[56] References Cited

U.S. PATENT DOCUMENTS

| | | | |
|---|---|---|---|
| 1,289,993 | 12/1918 | Winne | 65/112 |
| 2,156,156 | 4/1939 | Mahlck | 65/23 |
| 3,445,211 | 5/1969 | Kerstetter | 65/56 |
| 3,770,405 | 11/1973 | DeAngelis et al. | 65/23 |

FOREIGN PATENT DOCUMENTS 901818  3/1953  Fed. Rep. of Germany .......... 65/56

OTHER PUBLICATIONS

WEMPE, A.P.C. Publication Serial, No. 125, 892, Apr. 27, 1943.

*Primary Examiner*—Arthur D. Kellogg
*Attorney, Agent, or Firm*—Limbach, Limbach & Sutton

[57] ABSTRACT

A method for making perforations or forming depressions in a glass work piece is described. Pursuant to the method, a two piece housing for the work piece is provided. The housing when assembled has a cavity conforming in size and shape to the work piece. The lower housing piece has a continuous upper surface and the upper housing piece has a smooth lower surface and openings in the housing piece conforming in size and position to the perforations or depressions desired to be made in the work piece. The work piece is enclosed in the housing and then plugs are inserted in the openings in the upper housing piece. The plugs snugly fit the openings and extend above the upper surface of the upper housing piece. A weight is then disposed on the upper surface of the plugs. The weight may be a flat metal sheet and is of sufficient weight to cause the plugs to exert a pressure of at least about one half pound per square inch on the work piece. The resulting assembly is then subjected to a temperature intermediate the softening point and the working point of the work piece and the temperature is maintained until descent of the plugs into the work piece ceases. The assembly is then cooled to ambient temperature, the work piece is removed from the housing and then the plugs are removed from the work piece.

8 Claims, 3 Drawing Figures

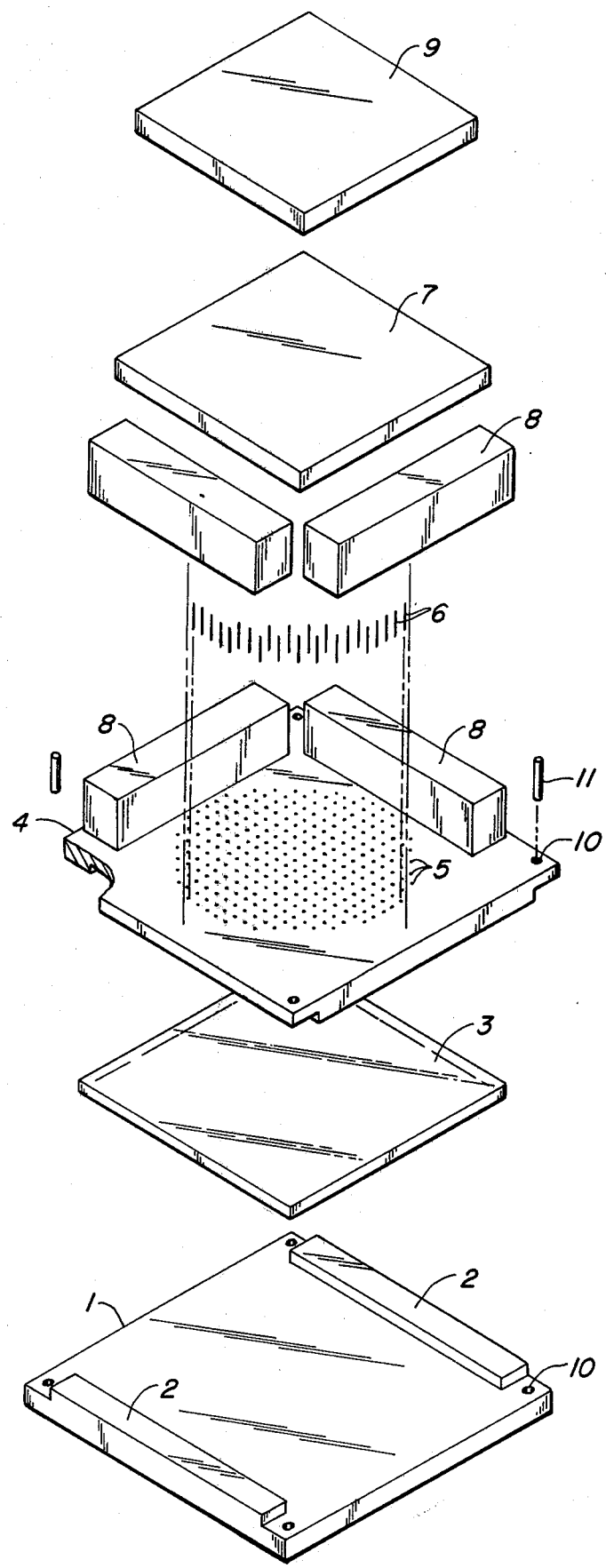
FIG.—1.

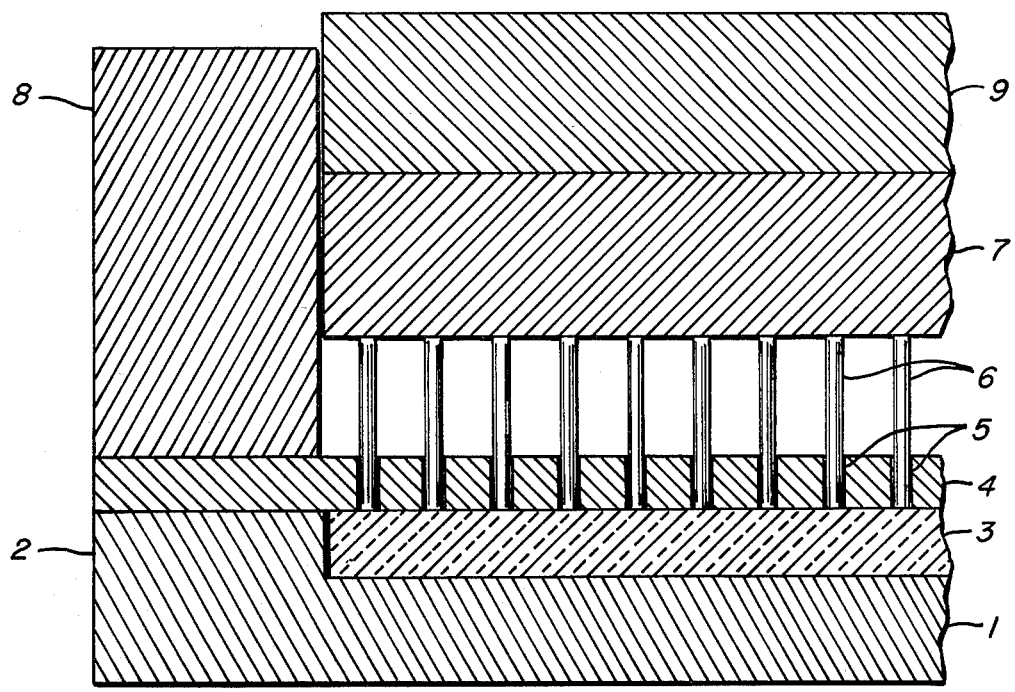
FIG._2.
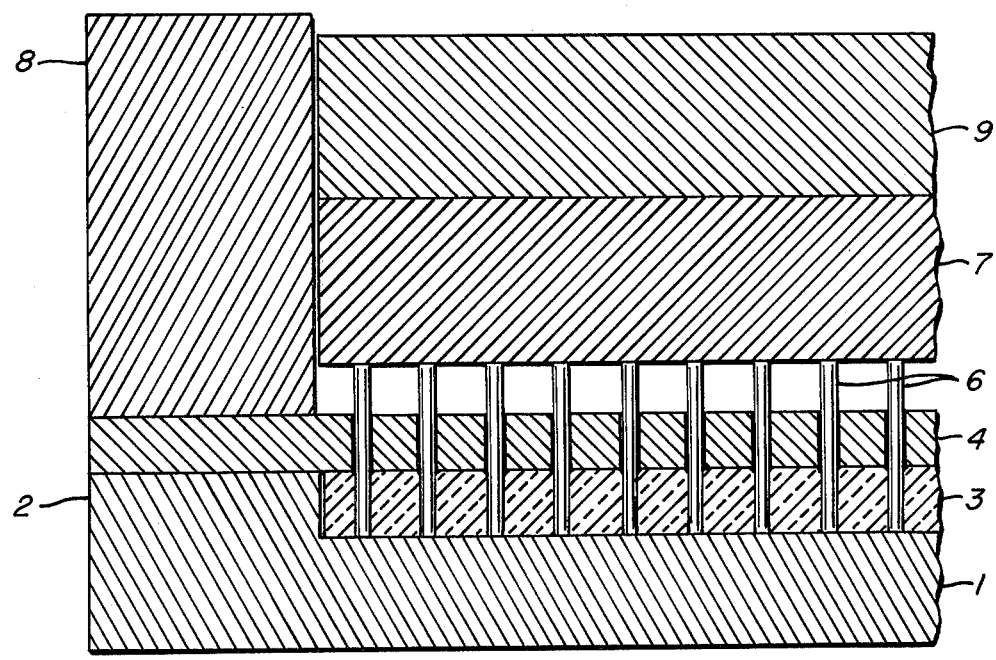
FIG._3.

METHOD FOR MAKING PERFORATIONS OR DEPRESSIONS IN A GLASS WORK PIECE

BACKGROUND OF THE INVENTION

In the past glass bodies such as glass plates have been perforated by drilling holes in the plate using bonded diamond drills or by using an ultrasonic tool in combination with an abrasive slurry. These methods are adequate and economically practical where the number of holes to be drilled through a glass plate is small. More recently, however, there has been a growing demand for glass plates perforated by dozens or hundreds of small circular holes. For example in the manufacture of solid state pressure transducers glass plates having 200 to 500 small circular holds accurately positioned in the glass plate are used. To produce such plates by mechanical drilling or ultrasonic drilling is time consuming and expensive.

It is the object of the present invention to provide a method for making multiple perforations and/or depressions in a glass work piece rapidly, accurately and efficiently.

BRIEF DESCRIPTION OF THE DRAWINGS

FIG. 1 of the appended drawings is an exploded view of the housing, work piece, plugs and weights used in the practice of the invention.

FIG. 2 of the drawings is a cross section of the housing, work piece, plugs and weights assembled prior to subjecting the assembly to heat treatment.

FIG. 3 of the drawings shows the assembly of FIG. 2 at the end of the heat treatment step.

DETAILED DESCRIPTION OF THE INVENTION

A perforated glass plate for use in the manufacture of a pressure transducer was prepared by the method of the invention employing the apparatus shown in the drawings. The lower piece of the housing 1 was four inches square and had a flat upper surface. On each of the two opposing edges of the housing piece was a raised flange 2 having a height of 0.13 inch and a width of 0.375 inch. A square glass plate 3 measuring 3.25 inches on each side and having a thickness of 0.135 inch was laid on the surface of the lower housing piece so that its edges coincided with the interior edges of the flanges. Upper housing piece 4 had the same lateral dimensions as the lower housing piece, is 0.13 inch thick and also had two flanges on opposing sides of the upper housing piece. The flanges are of the same dimensions as the flanges on the lower housing piece. The arrangement of the flanges is such that the two flanges on the lower housing piece are in an east-west relationship while the two flanges on the upper housing piece are in a north-south relationship so that when the upper housing piece is laid over the lower housing piece the flanges form a cavity which is square and of a depth slightly less than the thickness of the glass work piece. The central area of the upper housing piece is perforated by 260 odd circular holes 5 of uniform diameter about 0.04 inches. The upper housing piece is laid over the lower housing piece to enclose the glass work piece. Cylindrical plugs or pins 6 having a diameter of 0.04 inches and a length of 0.375 inches are inserted into each of the holes in the upper housing piece and come to rest on the surface of the glass work piece. A flat graphite plate 7 is placed on the upper surface of the pins. The graphite plate is sized to cover the central area of the upper housing piece and leave the edge areas of the upper piece open to accommodate side weights 8 which are disposed along the outer areas of the four sides of the upper housing piece. The side weights are ordinarily about ¼ pound. A stainless steel sheet 9 having a weight about one pound is laid on the upper surface of the graphite plate. The assembly of the two housing pieces, a glass work piece, the pins, the graphite plate, and the stainless steel and side weights are placed in a furnace and heated to a temperature lying between the softening point and the working point of the glass work piece. Usually this temperature is from 200° C. to 300° C. above the softening point. The atmosphere is a non-oxidizing atmosphere which may be nitrogen or nitrogen containing 2-3% of hydrogen which provides a slightly reducing atmosphere. The non-oxidizing atmosphere is required when the housing and the pins are formed from graphite which is the preferred material for construction for both of these items. The assembly is maintained at the elevated temperature until descent of the pins into the glass work piece ceases, usually a period of 10 to 15 minutes. At the end of this heating period the assembly is cooled to ambient temperature, the upper housing piece is removed and the work piece containing the pins is removed from the surface of the lower housing piece. The pins are then removed from the work piece. The pins may be removed mechanically by pressing them out of the work piece using a simple die that is of male matching pattern with the perforations in the work piece and of sufficient hardness to force the pins out of the perforations in the work piece. The pins may also be removed chemically by dissolving them. Where the pins are graphite, chromic acid is a suitable material for dissolving them from the work piece.

After the pins have been removed from the work piece, the work piece is annealed and then lapped and polished to produce the finished product.

The practice of the invention is described in the following examples:

EXAMPLE 1

A two-piece housing was prepared corresponding to the housing shown in FIG. 1. The housing was made from graphite and the upper and lower housing pieces and the flanges on them were so proportioned that the cavity lying between the two housing pieces was 3-¼ inches square and 0.13 inches deep. The upper housing piece had a thickness of 0.12 inch and was penetrated by 269 circular holes having a diameter 0.04 inch. The holes lay in a generally circular area in the central portion of the glass plate and were uniformly spaced from each other.

A Pyrex glass plate measuring 3-¼ inches on each side and being 0.135 inch thick was inserted in the cavity of the housing. Pyrex is a trademark under which certain borosilicate glasses are sold.

Graphite pins measuring 0.04 inches in diameter and 0.375 inches in length were inserted in each of the holes in the upper housing piece. A graphite plate of a size slightly larger than the hole pattern was laid on the upper surface of the pins disposed in the upper housing piece. A stainless steel sheet weighing one pound was placed on the upper surface of the graphite plate. Four stainless steel side weights are then placed on the top surface of the upper housing piece parallel to the outside edges. This assembly was then passed into a belt furnace having an atmosphere consisting of 98% nitrogen and 2% hydrogen and heated to a temperature of 1080° C. This temperature was maintained for a period of ten minutes after which the assembly was slowly cooled to room temperature. The glass plate was removed from the housing and the graphite pins were mechanically pushed out of the glass plate. The plate was then annealed at 600° C. for one hour and then lapped and polished to produce the finished product.

EXAMPLE 2

Example 1 was repeated but the pins employed to produce the holes in the glass plate were formed from a mixture of 30 to 40% clay and 60 to 70% finely divided graphite.

EXAMPLE 3

Example 1 was again repeated with the difference that the pins employed for producing the holes in the glass workpiece were made from metallic copper.

EXAMPLE 4

A glass plate 3-¼ inches square and 0.135 inches thick was placed in the housing described in Example 1. The procedure described in the Example 1 was repeated. The upper piece of the housing employed was penetrated by both circular apertures and by variety of non-circular apertures of varying shape. Pins corresponding in cross-section to the cross-section of the several apertures were inserted in each of the apertures. Most of the pins employed had a length of 0.375 inch. However a number of the pins had a lesser length and as a result did not completely penetrate the glass work piece but simply descended into it to produce a depression having the shape of the pin in the glass work piece rather than to produce a through hole. The housing, work piece, pins, graphite plate, stainless steel sheet, and side weights were assembled and passed into a belt furnace and there maintained at a temperature of 1080° C. for about ten minutes. The assembly was then withdrawn from the furnace, cooled to ambient temperature and opened to remove the work piece which was then annealed at 600° C. and lapped and polished to produce the finished product.

Housings larger or smaller than those used in the examples may be employed in the practice of the invention. The cavity enclosed in the housing can be of any desired shape: square, triangular, pentagonal, etc. The housing may be built to accomodate not only glass plates having flat surfaces but glass bodies having convex or concave surfaces. Graphite is the preferred material from which to construct the housing. Metals of high melting point could be used if desired but graphite appears to be more readily shaped and cheaper to use. The openings in the upper section of the housing may be of any desired shape and of small or large size.

The upper surface of the lower housing piece is commonly a continuous flat surface but frequently it may be desired to form raised areas or depressions in the lower surface of the work piece. Raised areas or depressions may be formed in the upper surface of the lower housing piece to produce respectively depressions or raised areas on the bottom surface of the work piece.

The plugs or pins which are inserted into the apertures in the upper section of the housing have a length or thickness such that they extend above the upper surface of the housing a distance greater than the thickness of the glass work piece if it is desired to open through holes in the work piece. When it is desired to open through holes in the work piece and in addition to open depressions which penetrate the work piece but do not go through it then the pins or plugs used to produce depressions in the work piece which do not extend entirely through it will be shorter than the plugs used in producing through holes by an amount equal to the thickness of the work piece minus the depth of the depression desired to be created in it by the plugs.

The pins or plugs used for insertion in the openings in the upper half of the housing are preferably made from graphite or from graphite-clay mixtures. Metal pins or plugs may be used but they are usually more difficult to remove from the work piece at the end of the heating step than are the graphite pins.

The upper housing piece simply rests above the lower housing piece and the work piece lies in the cavity between the two. Holes may be drilled in the corners of the two housing pieces and pins inserted in the holes to prevent movement of the housing pieces relative to each other if desired. Holes 10 and pins 11 shown in FIG. 1 illustrate this type of arrangement.

The upper housing piece simply rests on the lower housing piece and the work piece lies between the two. As a result of using this arrangement the glass which is displaced from the work piece as perforations are made in it simply flows into the main body of the work piece and results in a slight thickening of it as a result of producing the perforations.

The glass work pieces are annealed at conventional temperatures for the type of glass employed.

Conventional methods for lapping and polishing are employed.

When a work piece has been removed from the housing it will frequently be found that very thin films of glass overlay the bottom of the through holes which were intended to be made. Such thin films are readily removed during the lapping operation.

The weight disposed on the upper surfaces of the plugs are sufficient to cause the plugs to exert a pressure of at least 0.20 lb. per square inch on the work piece. Generally weights sufficient to cause plug pressures on the work piece in the range 0.20 to about 5 lb. per square inch may be employed.

The term "softening point" is defined as the temperature at which a glass will rapidly deform under its own weight.

The term "working point" is defined as the temperature at which a glass is soft enough for hot working.

Softening points and working points for various glasses are readily available in the literature.

What is claimed is:

1. The method of opening holes or forming depressions in a glass workpiece which comprises:
   (1) providing a two piece housing for said workpiece, said housing when assembled having a cavity conforming in size and shape to said workpiece, the lower housing piece having a continuous upper surface and the upper housing piece having a smooth surface and openings in said housing piece conforming in size and position to the holes or depressions desired to be made in said workpiece,
   (2) placing said workpiece on the upper surface of the housing piece and covering the upper surface of workpiece with the upper housing piece so that the upper surface of said workpiece and the lower surface of the upper housing piece are in contact with each other, (3) inserting in the openings in said upper housing piece plugs snugly fitting said openings and extending above the upper surface of said housing piece, (4) disposing on the upper surface of said plugs a weight sufficient to cause said plugs to exert a pressure of at least 0.2 pounds per square inch on said workpiece, (5) heating the assembly resulting from steps 1 to 4 to a temperature intermediate the softening point and the working point of the workpiece and maintaining such temperature until the plug's descent into the workpiece ceases and the glass displaced by the descent of the plugs flows into the body of the workpiece causing a slight thickening of the workpiece, (6) cooling said assembly to ambient temperature, and (7) removing the workpiece from the housing and removing the plugs from the workpiece.

2. The method defined in claim 1 wherein the housing and the plugs are formed from graphite.

3. The method defined in claim 1 wherein the housing is formed from graphite and the plugs are formed from graphite-clay mixtures.

4. The method defined in claims 2 or 3 wherein the assembly is heated in a non-oxidizing atmosphere.

5. The method defined in claim 1 wherein the upper surfaces of the lower housing piece has raised or depressed areas in its surface to produce depressions or raised areas respectively on the lower surface of the workpiece.

6. The method defined in claim 1 wherein the lower surface of the upper housing piece has raised or depressed areas in its surface to produce depressions or raised areas respectively on the upper surface of the workpiece.

7. The method of simultaneously opening a large number of very small diameter holes in a glass plate which comprises:

(1) providing a two piece housing for said glass plate said housing when assembled having a cavity conforming in size and shape to said plate, the lower housing piece having a continuous upper surface and the upper housing piece having a smooth surface and dozens to hundreds of openings in said housing piece conforming in size and position to the holes desired to be made in said plate, (2) placing said plate on the upper surface of the lower housing piece and covering the upper surface of the plate with the upper housing piece so that the upper surface of the plate and the lower surface of the upper housing piece are in contact with each other, (3) inserting in the openings in said upper housing piece graphite pins snugly fitting said openings and extending above the upper surface of said housing piece, (4) disposing on the upper surface of said pins a weight sufficient to cause said pins to exert a pressure of at least 0.2 pound per square inch on said plate, (5) heating the entire assembly resulting from steps (1) to (4) in a furnace to a temperature intermediate the softening point and the working point of the glass plate and maintaining such temperature until the pins' descent into the plate ceases and the glass displaced by the descent of the pins flows into the body of the plate causing a slight thickening of the plate, (6) cooling said assembly to ambient temperature, (7) removing the plate from the housing and removing the pins from the plate, (8) annealing the plate and then lapping and polishing it.

8. The method defined in claim 7 in which the diameter of the holes produced in the plate is about 0.04 of an inch.

* * * * *